United States Patent
Liu et al.

(10) Patent No.: US 12,185,345 B2
(45) Date of Patent: *Dec. 31, 2024

(54) METHOD, NETWORK DEVICE AND TERMINAL DEVICE FOR SEMI-PERSISTENT SCHEDULING

(71) Applicant: TELEFONAKTIEBOLAGET LM ERICSSON (PUBL), Stockholm (SE)

(72) Inventors: Jinhua Liu, Beijing (CN); Min Wang, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/607,218

(22) Filed: Mar. 15, 2024

(65) Prior Publication Data
US 2024/0224314 A1  Jul. 4, 2024

Related U.S. Application Data

(63) Continuation of application No. 18/132,689, filed on Apr. 10, 2023, which is a continuation of application
(Continued)

(30) Foreign Application Priority Data

Jan. 4, 2018  (WO) ................ PCT/CN2018/071341

(51) Int. Cl.
*H04W 72/53*  (2023.01)
*H04L 1/1607*  (2023.01)
(Continued)

(52) U.S. Cl.
CPC .......... *H04W 72/53* (2023.01); *H04L 1/1614* (2013.01); *H04W 72/23* (2023.01); *H04W 80/02* (2013.01)

(58) Field of Classification Search
None
See application file for complete search history.

(56) References Cited

U.S. PATENT DOCUMENTS

2015/0036664 A1* 2/2015 Yuk ................. H04W 36/0069
370/332
2017/0019812 A1 1/2017 Lee et al.
(Continued)

FOREIGN PATENT DOCUMENTS

| CN | 102595600 A | 7/2012 |
| CN | 103516496 A | 1/2014 |

(Continued)

OTHER PUBLICATIONS

3GPP TS 36.321 V14.2.0, "3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.2.0, Mar. 2017.

(Continued)

*Primary Examiner* — Robert M Morlan

(57) ABSTRACT

Methods for facilitating communication between a user equipment and a host computing system providing an over-the-top service are disclosed. A method comprises sending, to a terminal device, a first uplink (UL) SPS configuration message via a Layer 1 signal to configure or deconfigure a UL SPS grant in a cell among one or more cells configured to the terminal device; and receiving, from the terminal device, a first Media Access Control (MAC) Control Element (CE) for confirmation of the first UL SPS configuration message, wherein the first MAC CE comprises a first indicator to confirm the first UL SPS configuration message, or wherein there is a correspondence between the first UL SPS configuration message and the first MAC CE when
(Continued)

200

202
Sending, to a terminal device, a first uplink(UL) SPS configuration message via a Layer 1 signal to configure or deconfigure a UL SPS grant in a cell among one or more cells configured to the terminal device

204
Receiving, from the terminal device, a first media access control (MAC) control element (CE) for confirmation of the first UL SPS configuration message, wherein the first MAC CE comprises a first indicator to confirm the first UL SPS configuration message, or wherein there is a correspondence between the first UL SPS configuration message and the first MAC CE when there are two or more first UL SPS configuration messages to be sent and two or more first MAC CEs to be received there are two or more first UL SPS configuration messages to be sent and two or more first MAC CEs to be received.

19 Claims, 8 Drawing Sheets

Related U.S. Application Data

No. 16/309,838, filed as application No. PCT/CN2018/115644 on Nov. 15, 2018, now Pat. No. 11,627,582.

(51) Int. Cl.
*H04W 72/23* (2023.01)
*H04W 80/02* (2009.01)

(56) References Cited

U.S. PATENT DOCUMENTS

| | | |
|---|---|---|
| 2017/0019881 A1 | 1/2017 | Cao et al. |
| 2017/0332358 A1 | 11/2017 | Park et al. |
| 2020/0053736 A1 | 2/2020 | Liu et al. |
| 2020/0328868 A1 | 10/2020 | Kim et al. |

FOREIGN PATENT DOCUMENTS

| | | |
|---|---|---|
| CN | 103874232 A | 6/2014 |
| CN | 104427626 A | 3/2015 |
| CN | 106559754 A | 4/2017 |
| CN | 107040597 A | 8/2017 |
| RU | 2584825 C1 | 5/2016 |

OTHER PUBLICATIONS

CATT, "Discussion on multiple SPS", 3GPP TSG-RAN WG2 Meeting #NR AH2 R2-1706370, Jun. 27-29, 2017, Qingdao, China.
Ericsson, "SPS confirmation for V2X", 3GPP TSG-RAN WG2 #98 R2-1705541, May 15-19, 2017, Hangzhou, China.
Microsoft, Microsoft computer dictionary: 5th edition, 2022, p. 61.
Oppo, "Support SPS on SCell", 3GPP TSG-RAN WG2 #99 R2-1707742, Aug. 21-25, 2017, Berlin, Germany.
Samsung Electronics R&D Institute UK, R2-1710335, "Considerations of the number of SPS configurations per cell group and TP for TS 38.321v1.0.0", 3GPP TSG-RAN WG2 #99-Bis, Prague, Czech Republic, Oct. 9-13, 2017.
Samsung, "MAC CE formats for NR", 3GPP TSG-RAN WG2 Meeting #99bis R2-1710907, Oct. 9-13, 2017, Prague, Czech.

\* cited by examiner a) A bitmap with 8 configured cells b) A bitmap with 5 active cells

1400

1402

Receiving user data originating from a transmission from a terminal device to a network device

Initiating a transmission carrying user data to the terminal device via the network device

Fig.15

METHOD, NETWORK DEVICE AND TERMINAL DEVICE FOR SEMI-PERSISTENT SCHEDULING

RELATED APPLICATIONS

This application is a continuation of U.S. patent application Ser. No. 18/132,689, filed Apr. 10, 2023, which is a continuation of U.S. patent application Ser. No. 16/309,838, filed Dec. 13, 2018, and granted as U.S. Pat. No. 11,627,582 on Apr. 11, 2023, which is a 35 U.S.C. § 371 national phase filing of International Application No. PCT/CN2018/115644, filed Nov. 15, 2018, which claims the benefit of International Application No. PCT/CN2018/071341, filed Jan. 4, 2018, the disclosures of which are incorporated herein by reference in their entireties.

TECHNICAL FIELD

Embodiments of the disclosure generally relate to wireless communication, and, more particularly, to method, network device and terminal device for semi-persistent scheduling (SPS).

BACKGROUND

In a wireless network such as long term evolution (LTE) system, there is a scheduling functional entity which may support dynamic scheduling and semi-persistent scheduling (or known as semi-static scheduling). In new radio (NR), semi-persistent scheduling can be also referred to as configured scheduling (CS).

For example, in LTE, uplink (UL) SPS refers to that an evolved NodeB (eNB) may configure some parameters such as periodicity and start position of transmission occasion occurrence and the parameters for HARQ (hybrid automatic repeat request) operation for a user equipment (UE) via radio resource control (RRC) signaling. The other parameters, such as modulation and coding scheme (MCS), time-frequency resources are configured via Layer 1 signaling to activate/release semi-static grant. At activation/release semi-static grant upon receiving a Layer 1 signal, the UE sends to a serving eNB a media access control (MAC) control element (CE) to confirm a UL SPS configuration message.

During sub-frames in which resources are pre-configured for the UE, the UE performs uplink transmission according to the pre-configured resources at corresponding TTI (transmission time interval) if the UE does not discover its cell radio network temporary identifier (C-RNTI) on the control channel.

SUMMARY

This summary is provided to introduce a selection of concepts in a simplified form that are further described below in detailed description. This summary is not intended to identify key features or essential features of the claimed subject matter, nor is it intended to be used to limit the scope of the claimed subject matter. In NR, UL SPS is also referred to as Type 2 configured scheduling and the allocated semi-static grant can be also referred to as configured grant Type 2. In the description below, the term SPS is used for simplicity, and the semi-static grant allocated via UL SPS mechanism is referred to UL SPS grant.

According to an aspect of the disclosure, it is provided a method for Semi-Persistent Scheduling (SPS) in uplink (UL). The method may comprise: sending, to a terminal device, a UL SPS configuration message via a Layer 1 signal to configure or deconfigure a UL SPS grant in a cell among one or more cells configured to the terminal device. The method may further comprise: receiving, from the terminal device, a first media access control (MAC) control element (CE) for confirmation of the first UL SPS configuration message. In this method, the first MAC CE may comprise a first indicator to confirm the first UL SPS configuration message, or there may be a correspondence between the first UL SPS configuration message and the first MAC CE when there are two or more first UL SPS configuration messages to be sent and two or more first MAC CEs to be received.

According to another aspect of the disclosure, it is provided a method for Semi-Persistent Scheduling (SPS) in UL. The method may comprise: receiving, from a network device, a first uplink(UL) SPS configuration message via a Layer 1 signal to configure or deconfigure a UL SPS grant in a cell among one or more cells configured to a terminal device. The method may further comprise: sending, to the network device, a first media access control (MAC) control element (CE) for confirmation of the first UL SPS configuration message. In this method, the first MAC CE comprises a first indicator to confirm the first UL SPS configuration message, or there is a correspondence between the first UL SPS configuration message and the first MAC CE when there are two or more first UL SPS configuration messages to be sent and two or more first MAC CEs to be received.

According to another aspect of the disclosure, it is provided a network device. The network device may comprises: a processor; and a memory, the memory containing instructions executable by the processor, whereby the network device may be operative to: send, to a terminal device, a first uplink(UL) SPS configuration message via a Layer 1 signal to configure or deconfigure a UL SPS grant in a cell among one or more cells configured to the terminal device. The network device may be operative to receive, from the terminal device, a first media access control (MAC) control element (CE) for confirmation of the first UL SPS configuration message. The first MAC CE may comprise a first indicator to confirm the first UL SPS configuration message, or there may be a correspondence between the first UL SPS configuration message and the first MAC CE when there are two or more first UL SPS configuration messages to be sent and two or more first MAC CEs to be received.

According to another aspect of the disclosure, it is provided a terminal device. The terminal device may comprises: a processor; and a memory, the memory containing instructions executable by the processor, whereby the terminal device may be operative to: receive, from a network device, a first uplink(UL) SPS configuration message via a Layer 1 signal to configure or deconfigure a UL SPS grant in a cell among one or more cells configured to a terminal device. The terminal device may further be operative to send, to the network device, a first media access control (MAC) control element (CE) for confirmation of the first UL SPS configuration message. The first MAC CE may comprise a first indicator to confirm the first UL SPS configuration message, or there is a correspondence between the first UL SPS configuration message and the first MAC CE when there are two or more first UL SPS configuration messages to be sent and two or more first MAC CEs to be received.

According to another aspect of the disclosure, it is provided a computer program product. The computer program product comprises instructions which when executed by at least one processor, may cause the at least one processor to send, to a terminal device, a first uplink(UL) SPS configuration message via a Layer 1 signal to configure or deconfigure a UL SPS grant in a cell among one or more cells configured to the terminal device. The at least one processor may further be caused to receive, from the terminal device, a first media access control (MAC) control element (CE) for confirmation of the first UL SPS configuration message. The first MAC CE may comprise a first indicator to confirm the first UL SPS configuration message, or there is a correspondence between the first UL SPS configuration message and the first MAC CE when there are two or more first UL SPS configuration messages to be sent and two or more first MAC CEs to be received.

According to another aspect of the disclosure, it is provided a computer program product. The computer program product comprises instructions which are executed by at least one processor and may cause the at least one processor to receive, from a network device, a first uplink(UL) SPS configuration message via a Layer 1 signal to configure or deconfigure a UL SPS grant in a cell among one or more cells configured to a terminal device. The at least one processor may further be caused to send, to the network device, a first media access control (MAC) control element (CE) for confirmation of the first UL SPS configuration message. The first MAC CE may comprise a first indicator to confirm the first UL SPS configuration message, or there may be a correspondence between the first UL SPS configuration message and the first MAC CE when there are two or more first UL SPS configuration messages to be sent and two or more first MAC CEs to be received.

According to another aspect of the disclosure, it is provided a computer readable storage medium. The computer readable storage medium comprises instructions which are executed by at least one processor and may cause the at least one processor to send, to a terminal device, a first uplink (UL) SPS configuration message via a Layer 1 signal to configure or deconfigure a UL SPS grant in a cell among one or more cells configured to the terminal device. The at least one processor may further be caused to receive, from the terminal device, a first media access control (MAC) control element (CE) for confirmation of the first UL SPS configuration message. The first MAC CE may comprise a first indicator to confirm the first UL SPS configuration message, or there is a correspondence between the first UL SPS configuration message and the first MAC CE when there are two or more first UL SPS configuration messages to be sent and two or more first MAC CEs to be received.

According to another aspect of the disclosure, it is provided a computer readable storage medium. The computer readable storage medium comprises instructions which are executed by at least one processor and may cause the at least one processor to receive, from a network device, a first uplink(UL) SPS configuration message via a Layer 1 signal to configure or deconfigure a UL SPS grant in a cell among one or more cells configured to a terminal device. The at least one processor may further be caused to send, to the network device, a first media access control (MAC) control element (CE) for confirmation of the first UL SPS configuration message. The first MAC CE may comprise a first indicator to confirm the first UL SPS configuration message, or there may be a correspondence between the first UL SPS configuration message and the first MAC CE when there are two or more first UL SPS configuration messages to be sent and two or more first MAC CEs to be received.

According to another aspect of the disclosure, it is provided a method implemented in a communication system including a host computer, a network device and a terminal device. The method may comprise: at the host computer, receiving user data originating from a transmission from the terminal device to the network device. In this method, the network device may be configured to perform any of the methods associated with the network device as described above. The terminal device may be configured to perform any of the methods associated with the terminal device as described above.

According to another aspect of the disclosure, it is provided a method implemented in a communication system including a host computer, a network device and a terminal device. The method may comprise: at the host computer, initiating a transmission carrying user data to the terminal device via the network device. In this method, the network device may be configured to perform any of the methods associated with the network device as described above. The terminal device may be configured to perform any of the methods associated with the terminal device as described above.

According to another aspect of the disclosure, it is provided a communication system including a host computer. The host computer may comprise: a processing circuitry configured to provide user data. The host computer may further comprise a communication interface configured to receive user data originating from a transmission from a terminal device to a network device. The network device may comprise a processor and a memory, the memory containing instructions executable by the processor, whereby the network device may be configured to perform any of the methods associated with the network device as described above. The terminal device may comprise a processor and a memory, the memory containing instructions executable by the processor, whereby the terminal device may be configured to perform any of the methods associated with the terminal device as described above.

According to another aspect of the disclosure, it is provided a communication system including a host computer. The host computer may comprise: a processing circuitry configured to provide user data. The host computer may further comprise a communication interface configured to initiate a transmission carrying user data to a terminal device via a network device. The network device may comprise a processor and a memory, the memory containing instructions executable by the processor, whereby the network device may be configured to perform any of the methods associated with the network device as described above. The terminal device may comprise a processor and a memory, the memory containing instructions executable by the processor, whereby the terminal device may be configured to perform any of the methods associated with the terminal device as described above.

These and other objects, features and advantages of the disclosure will become apparent from the following detailed description of illustrative embodiments thereof, which are to be read in connection with the accompanying drawings.

BRIEF DESCRIPTION OF THE DRAWINGS

FIG. 14 is a flow chart depicting a method implemented in a communication system according to an embodiment of the disclosure; and FIG. 15 is a flow chart depicting a method implemented in a communication system according to another embodiment of the disclosure.

DETAILED DESCRIPTION

Figure 1:
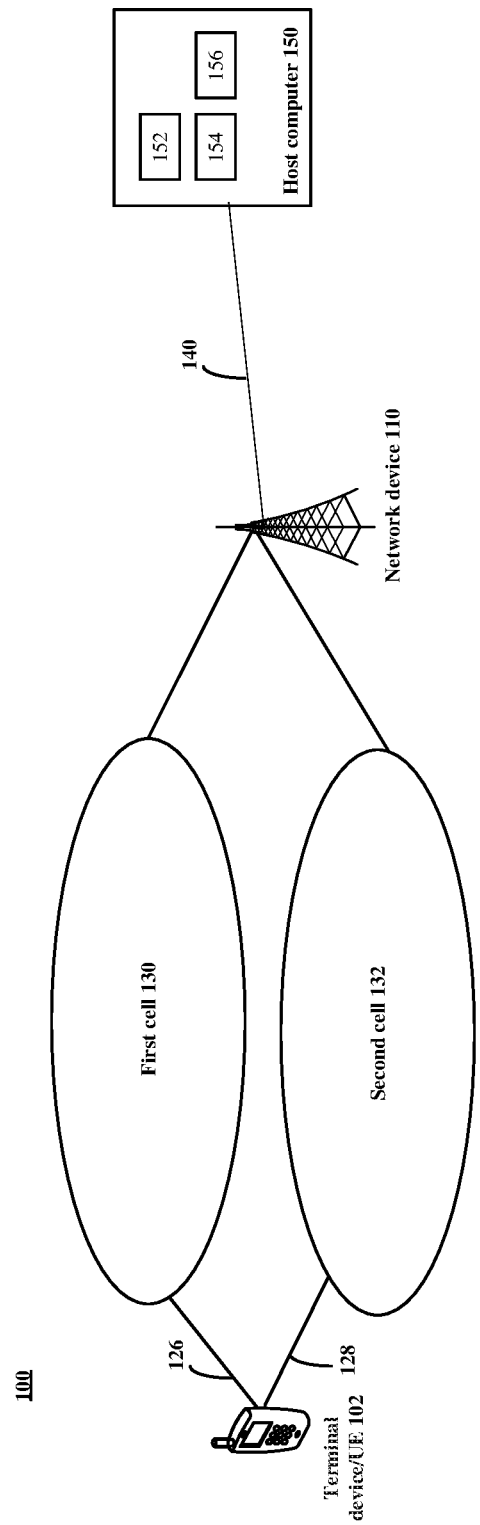
FIG. 1 depicts a schematic system, in which some embodiments of the present disclosure can be implemented.

For the purpose of explanation, details are set forth in the following description in order to provide a thorough understanding of the embodiments disclosed. It is apparent, however, to those skilled in the art that the embodiments may be implemented without these specific details or with an equivalent arrangement.

As used herein, the term "wireless communication network" or "wireless network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable, and/or other suitable the first generation (1G), the second generation (2G), 2.5G, 2.75G, the third generation (3G), the fourth generation (4G), 4.5G, the future fifth generation (5G) communication protocols such as NR, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VOIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

It is noted that though the embodiments below are mainly described in the context of the NR system, they are not limited to this but can be applied to any suitable communication system that can benefit from the embodiments as described herein, such as evolved LTE (e.g., for Rel-15 onwards) where UL SPS in secondary cell (SCell) may be supported in future.

In LTE, there is only SPS for downlink/uplink (DL/UL) in a primary cell or a primary secondary cell. For SPS for uplink in LTE, how to use MAC CE to confirm the SPS activation and release has been described in Section 5.10.2 of 3GPP TS 36.321-e20, the disclosure of which is incorporated by reference herein in its entirety:

"If SPS confirmation has been triggered and not cancelled:
  if the MAC entity has UL resources allocated for new transmission for this TTI:
    instruct the Multiplexing and Assembly procedure to generate an SPS confirmation MAC Control Element as defined in subclause 6.1.3.11;
    cancel the triggered SPS confirmation.

The MAC entity shall clear the configured uplink grant immediately after first transmission of SPS confirmation MAC Control Element triggered by the SPS release."

According to 3GPP TS 36.321-e20, a UE should send a MAC CE to confirm a reception of Layer 1 signal upon receiving the Layer 1 signal for activation/deactivation of the UL semi-persistent grant. This MAC CE was designed as "SPS confirmation MAC Control Element" in LTE. The details for this MAC CE can be found in Section 6.1.3.11 of 3GPP TS 36.321-e20: 'The SPS confirmation MAC control element is identified by a MAC PDU subheader with LCID as specified in table 6.2.1-2.
It has a fixed size of zero bits.'

In LTE, it is enough to use a MAC CE without payload to confirm UL SPS activation/release because there is at most one SPS configuration per MAC entity. While in a wireless network such as NR where there can be up to one UL SPS configuration per configured cell and the UL SPS configurations in different serving cells can be active simultaneously, the MAC CE format to confirm the UL SPS activation/release in LTE cannot be reused in this wireless network because there is ambiguity for a network device such as gNB to identify the correspondence between the received MAC CEs and the transmitted Layer 1 signals to activate/release UL semi-static grants in case of carrier aggregation (CA).

Therefore, it would be desirable to provide a solution for SPS in the wireless network where there can be up to one UL SPS configuration per configured cell and the UL SPS configurations in different serving cells can be active simultaneously.

Now some exemplary embodiments of the present disclosure will be described below with reference to the figures.

FIG. 1 depicts a schematic communication system, in which some embodiments of the present disclosure can be implemented. As shown in FIG. 1, the communication system 100 comprises a network device 110 such as a cellular base station, for example a gNB in NR. The network device 110 may refer to a function element on the network side as compared to a terminal device or UE. For example, the network device 110 may comprise an eNB, a Home eNode B, a femto Base Station, a pico BS, gNB or any other node capable to serve a terminal device 102 in the communication system 100. It is well known that a cellular radio system may comprise a network of radio cells each served by a transmitting station, known as a cell site or base transceiver station. The radio network provides wireless communications service for a plurality of transceivers (in most cases mobile). The network of network devices working in collaboration allows for wireless service which is greater than the radio coverage provided by a single network device. The individual network device may be connected by another network (in many cases a wired network, not shown), which includes additional controllers for resource management and in some cases access to other network systems (such as the Internet) or metropolitan area networks (MANs).

When carrier aggregation (CA) is used in the communication system 100, there may be a number of serving cells such as a first cell 130 and a second cell 132 which can be configured to the terminal device. Each serving cell may have respective component carriers (CCs). The coverage of the serving cells may differ, for example due to that CCs on different frequency bands may experience different path loss or different component carriers can be planned to provide different coverage, i.e. different cell size. In carrier aggregation, it may include two kind of carriers, primary component carrier in the primary serving cell (PCell) and secondary component carrier in the secondary cell (SCell). The secondary component carriers in the secondary cells (SCell) are all referred to as secondary component carriers which serve respective secondary serving cells. It is noted that through the network device 110 is shown as one entity in FIG. 1, the network device 110 can comprise two or more entities which belong to a same MAC entity.

As shown in FIG. 1, the communication system 100 may comprise a UE or terminal device 102, which may operably communicate with the network device 110 such as a cellular base station through a wireless link, such as wireless links 126 and 128. One or more cells may be configured to the terminal device 102. For example, the terminal device 102 may be configured with two or more cells in CA scenario. The terminal device 102 can be fixed or moveable. Terminal device 102 may include, but not limited to, cellular telephones, smart phones, and computers, whether desktop, laptop, or otherwise, as well as mobile devices or terminals such as cellular network UEs, machine type communication devices, handheld computers, personal digital assistants (PDAs), wireless sensors, wearable devices, video cameras, set-top boxes, personal media devices, or any combinations of the foregoing, which may be provided with wireless communication functionality and run with any kind of operating system including, but not limited to, Windows, Linux, UNIX, Android, IOS and their variants. In addition, though only one terminal device 102 is shown in FIG. 1, there may be two or more terminal devices.

The network device 110 may be connected to a host computer 150, which may be embodied in the hardware and/or software of a standalone server, a cloud-implemented server, a distributed server or as processing resources in a server farm. Host computer 150 may be under the ownership or control of a service provider, or may be operated by the service provider or on behalf of the service provider. A connection 140 between the network device 110 and the host computer 150 may extend directly from core network to the host computer 150 or may go via an optional intermediate network (not shown). The intermediate network may be one of, or a combination of more than one of, a public, private or hosted network; the intermediate network, if any, may be a backbone network or the Internet; in particular, the intermediate network may comprise two or more sub-networks (not shown).

The communication system 100 as a whole enables connectivity between the connected UE 102 and the host computer 150. The connectivity may be described as over-the-top (OTT) connections such as {126, 140} and {126, 140}. The host computer 150 and the connected UE 102 are configured to communicate data and/or signaling via OTT connections, using an access network (not shown), a core network (not shown), any intermediate network (not shown) and possible further infrastructure (not shown) as intermediaries. The OTT connections {126, 140} and {126, 140} may be transparent in the sense that the participating communication devices through which the OTT connections passes are unaware of routing of uplink and downlink communications. For example, the network device 110 may not or need not be informed about the past routing of an incoming downlink communication with data originating from the host computer 150 to be forwarded (e.g., handed over) to a connected UE 102. Similarly, the host computer 150 need not be aware of the future routing of an outgoing uplink communication originating from the UE 102 towards the host computer 150.

In communication system 100, host computer 150 comprises hardware including communication interface 152 configured to set up and maintain a wired or wireless connection with an interface of a different communication device of communication system 100. Host computer 150 further comprises processing circuitry 154, which may have storage and/or processing capabilities. In particular, processing circuitry 154 may comprise one or more programmable processors, application-specific integrated circuits, field programmable gate arrays or combinations of these (not shown) adapted to execute instructions. Host computer 150 further comprises software 156, which is stored in or accessible by host computer 150 and executable by processing circuitry 154. Software 156 includes host application. Host application may be operable to provide a service to a remote user, such as terminal device 102 connecting via OTT connections {126, 140} and/or {126, 140} terminating at terminal device 102 and host computer 150. In providing the service to the remote user, host application may provide user data which is transmitted using OTT connections {126, 140} and/or {126, 140}. The service provided by the host computer 150 can be any kind of service including, but not limited to, news service, social networking service such as LinkedIn, Facebook, Twitter, YouTube, messaging service such as WeChat, Yahoo! Mail, on-line shopping service such as Amazon, Alibaba, TaoBao etc, gaming service such as mobile gaming, computer gaming, and X sharing service such as bicycle sharing service.

In an embodiment, the communication interface 152 is configured to receive user data originating from a transmission from the terminal device 102 to the network device 110. In another embodiment, the communication interface 152 is configured to initiate a transmission carrying user data to the terminal device 102 via the network device 110.

Figure 2:
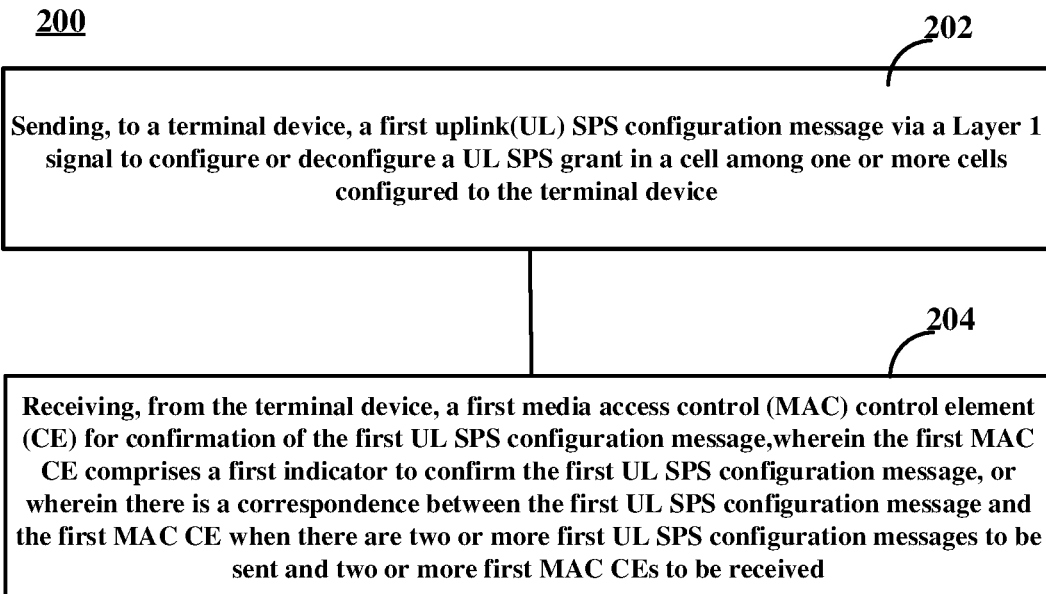
FIG. 2 is a flow chart depicting a method according to an embodiment of the present disclosure.

FIG. 2 is a flow chart depicting a method 200 according to an embodiment of the present disclosure, which may be performed at an apparatus such as the network device 110 of FIG. 1. As such, the network device 110 may provide means for accomplishing various parts of the method 200 as well as means for accomplishing other processes in conjunction with other components.

As shown in FIG. 2, the method 200 may start at block 202 where the network device 110 sends, to a terminal device, a first uplink(UL) SPS configuration message via a Layer 1 signal to configure or deconfigure a UL SPS grant in a cell among one or more cells configured to the terminal device. The Layer 1 signal may be any suitable physical layer signal used for carrying the semi-persistent scheduling grant, such as a physical downlink control channel (PDCCH) with the semi-persistent scheduling grant. For example, as shown in FIG. 1, the network device 110 may send, to the terminal device 102, a first uplink(UL) SPS configuration message via the PDCCH to configure or deconfigure a UL SPS grant in the first cell 130, and send, to the terminal device 102, another first uplink(UL) SPS configuration message via the PDCCH to configure or deconfigure a UL SPS grant in the second cell 132.

At block 204, the network device 110 receives, from the terminal device, a first media access control (MAC) control element (CE) for confirmation of the first UL SPS configuration message, wherein the first MAC CE comprises a first indicator to confirm the first UL SPS configuration message, or wherein there is a correspondence between the first UL SPS configuration message and the first MAC CE when there are two or more first UL SPS configuration messages to be sent and two or more first MAC CEs to be received.

In an embodiment, if there are two or more UL SPS configuration messages to configure or deconfigure the UL SPS grants in different cells configured to the terminal device, the blocks 202 and 204 may be performed respectively for two or more times.

Figure 3:
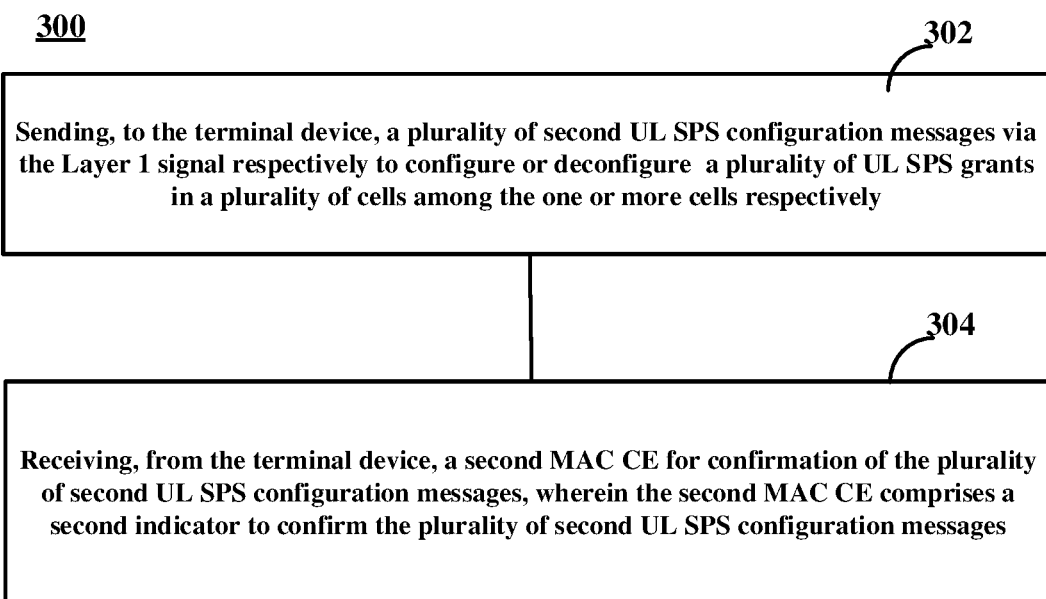
FIG. 3 is a flow chart depicting a method according to another embodiment of the present disclosure.

In another embodiment, when respective UL SPS grants for multiple serving cells are activated/released via respective Layer 1 signals, the confirmation messages for the multiple serving cells can be multiplexed into one MAC CE. FIG. 3 is a flow chart depicting a method according to an embodiment of the present disclosure, wherein the confirmation messages for the multiple serving cells can be multiplexed into one MAC CE. The method 300 may be performed at an apparatus such as the network device 110 of FIG. 1. As such, the network device 110 may provide means for accomplishing various parts of the method 300 as well as means for accomplishing other processes in conjunction with other components.

As shown in FIG. 3, the method 300 may start at block 302 where the network device 110 send, to the terminal device, a plurality of second UL SPS configuration messages via the Layer 1 signal respectively to configure or deconfigure a plurality of UL SPS grants in a plurality of cells among the one or more cells respectively. For example, as shown in FIG. 1, the network device 110 may send, to the terminal device 102, two UL SPS configuration messages via PDCCH respectively to configure the UL SPS grants in the first cell 130 and the second cell 132 respectively. The plurality of second UL SPS configuration messages may be sent in a short time duration.

At block 204, the network device 110 receives, from the terminal device, a second MAC CE for confirmation of the plurality of second UL SPS configuration messages, wherein the second MAC CE comprises a second indicator to confirm the plurality of second UL SPS configuration messages.

The first and second indicators can take any suitable form to confirm one or more UL SPS configuration messages. For example, the first and second indicators may comprise at least one of one or more cell indexes; one or more SPS configuration indexes; a bitmap of one or more cell indexes; and a bitmap of one or more SPS configuration indexes.

In an embodiment, upon reception of the Layer 1 signal to activate or release the UL SPS for a specific serving cell, the cell index of the serving cell is added into the MAC CE to confirm the UL SPS activation/release. For example, upon receiving the corresponding cell index in the MAC CE, the network device 110 such as gNB can determine that the operation to activate/release UL SPS for the serving cell is successful. Otherwise, the network device 110 determines that the operation to activate/release UL SPS for the serving cell fails.

Figure 4:
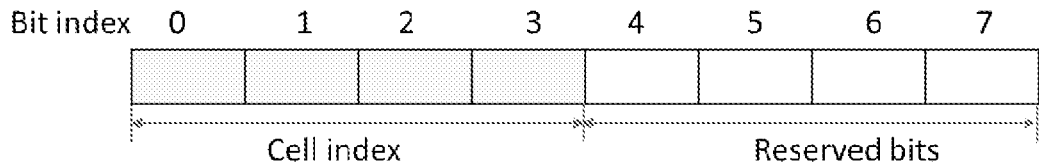
FIG. 4 schematically shows a MAC CE payload according to an embodiment of the present disclosure.

FIG. 4 shows a MAC CE payload comprising one cell index according to an embodiment of the present disclosure. As shown in FIG. 4, the MAC CE payload comprises a cell index corresponding to the operated UL SPS configuration, wherein the size of a cell index has a fixed size such as 4 bits. The size of the cell index may be fixed or depend on a maximum number of cells that can be configured in a carrier aggregation scenario. For example, the size of the cell index may be fixed at 2, 3, 4, 5 and 6 bits regardless of the maximum number of cells that can be configured in a carrier aggregation scenario. As another example, if there are 32 serving cells that can be configured at maximum for the terminal device or UE, the size of the cell index may occupy 5 bits.

In another embodiment, upon reception of two or more Layer 1 signals to activate or release the UL SPSes for two or more serving cells, two or more cell indexes of the serving cells can be added into one MAC CE to confirm the UL SPS activation/release. For example, upon receiving the corresponding two or more cell indexes in the MAC CE, the network device 110 such as gNB can determine that the operation to activate/release UL SPSes for the two or more serving cells is successful. Otherwise, if one or more of the two or more cell indexes are not carried in the MAC CE, the network device 110 may determine that the operation to activate/release UL SPS for the one or more cells fails. In this case, the network device 110 may resend the UL SPS configuration messages to configure or deconfigure the UL SPS grants in the one or more cells.

Figure 5:
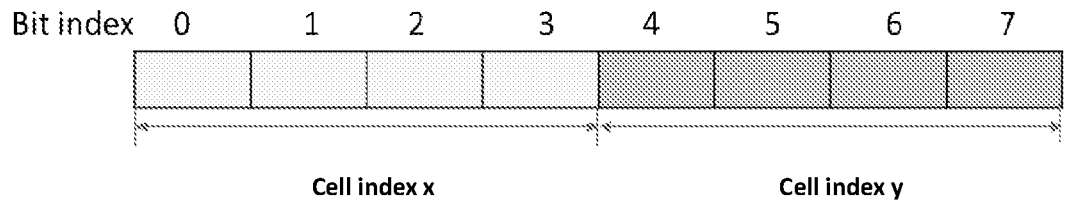
FIG. 5 schematically shows a MAC CE payload according to another embodiment of the present disclosure.

FIG. 5 shows a MAC CE payload comprising two or more cell indexes according to an embodiment of the present disclosure. As shown in FIG. 5, the MAC CE payload comprises two cell indexes corresponding to two operated UL SPS configurations, wherein the size of the cell index has a fixed size such as 4 bits. As described above, the size of the cell index may be fixed or depend on a maximum number of cells that can be configured in a carrier aggregation scenario.

In another embodiment, a bitmap of one or more cell indexes is carried in one MAC CE to confirm the UL SPS activation/release in these serving cells. For example, upon the reception of one or more Layer 1 signals to activate/release the UL SPS grants in one or more cells configured to the terminal device, the terminal device may set a corresponding bit in the bitmap for confirmation of the UL SPS configuration message. The bitmap information can be ordered from least significant bit (LSB) to most significant bit (MSB) according to a value of cell index in an increasing/decreasing order, and with a value set using the following logics:

bit "1" indicates that the corresponding serving cell is applied with the UL SPS configuration such as UL SPS activation/release;

bit "0" indicates that the corresponding serving cell is not applied with the UL SPS configuration such as UL SPS activation/release.

A length of the bitmap of one or more cell index may be fixed or depend on a number of the cells that are configured for the terminal device. For example, the length of the bitmap of one or more cell index may be fixed at a value selected from 3 to 64 bits. As another example, if there are 32 serving cells that can be configured at maximum for a terminal device or UE, the length of the bitmap of one or more cell indexes may be 32 bits.

Figure 6:
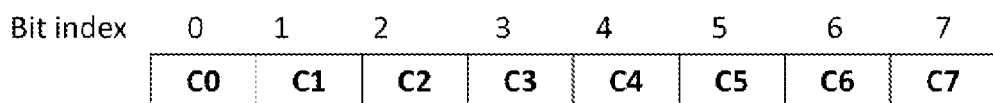
FIG. 6 schematically shows a MAC CE payload according to another embodiment of the present disclosure.
Figure 6:
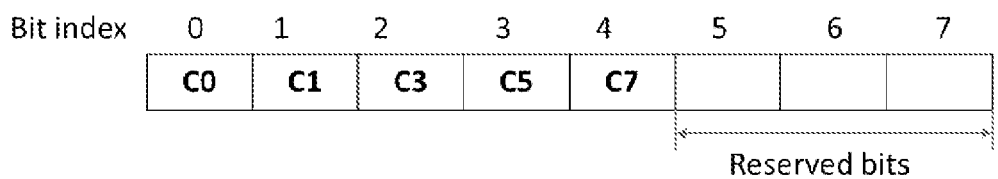

The form of the bitmap of one or more cell indexes may have three options:

Option 1: the bitmap of one or more cell indexes is created for all configured cells for the terminal device or UE regardless if the cell is active or inactive, i.e. each configured cell for the UE has a corresponding bit in the bitmap. FIG. 6-a) shows a MAC CE payload comprising the bitmap of one or more cell indexes of option 1 according to an embodiment of the present disclosure. As shown in FIG. 6-a), the bitmap occupies 8 bits each of which corresponds to one configured cell. Bit indexes 1-8 corresponds to eight configured cells C0-C7 respectively. For example, when the network device 110 sends, to the terminal device, one UL SPS configuration message via the Layer 1 signal to configure the UL SPS grant in the cell C0, the terminal device may set a bit of the bit index 0 as a value "1" and send the MAC CE comprising the bitmap to the network device. As another example, when the network device 110 sends, to the terminal device 102, two UL SPS configuration messages via the Layer 1 signal respectively to configure the UL SPS grants in two cells C0 and C1 respectively, the terminal device may set the bits of the bit indexes 0 and 1 as the value "1" and send the MAC CE comprising the bitmap to the network device.

Option 2: the bitmap of one or more cell indexes is created for all active cells for the terminal device or UE. The inactive cell is not included in the bitmap, i.e. each active cell has a corresponding bit in the bitmap. FIG. 6-*b*) shows the MAC CE payload comprising the bitmap of one or more cell indexes of option 2 according to an embodiment of the present disclosure. As shown in FIG. 6-*b*), 5 active cells C0, C1, C3, C5 and C7 have corresponding bits in the bitmap and the rest 3 bits are not used. For option 2, the bitmap length can be determined based on the maximum number of UL SPS configurations the can be configured for the terminal device or UE.

Option 3: the bitmap of one or more cell indexes is created for all active cells, which are configured with UL SPS, for the terminal device or UE. The inactive cell or the active cell without UL SPS configuration is not included in the bitmap, i.e. each active cell with UL SPS configuration has a corresponding bit in the bitmap. In such case, FIG. 6-*b*) shows the MAC CE payload comprising the bitmap of one or more cell indexes of option 3 according to an embodiment of the present disclosure. As shown in FIG. 6-*b*), 5 active cells C0, C1, C3, C5 and C7, which are configured with UL SPS have corresponding bits in the bitmap and the rest 3 bits are not used. For option 3, the bitmap length can be determined based on the maximum number of UL SPS configurations the can be configured for the terminal device or UE.

Figure 7:
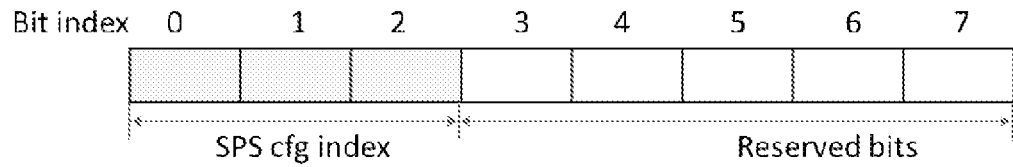
FIG. 7 schematically shows a MAC CE payload according to another embodiment of the present disclosure.

In another embodiment, instead of the cell index, the index of UL SPS configuration is indicated in the MAC CE, and each UL SPS configuration is associated with a serving cell and is assigned with a unique index. FIG. 7 shows a MAC CE payload carrying only one SPS configuration index according to an embodiment of the present disclosure. In this embodiment, the UE may send a different MAC CE to confirm the UL SPS activation/release for each serving cell.

As shown in FIG. 7, the MAC CE payload carries only one SPS configuration index associated with a cell, wherein the size of the SPS configuration index has a fixed size such as 3 bits. The size of the SPS configuration index may be fixed or depend on the maximum SPS configurations per MAC entity. For example, the size of the SPS configuration index may be fixed at 2, 3, 4, 5, 6 and 7 bits. As another example, when the maximum SPS configurations per MAC entity is 32, the size of the SPS configuration index may be 5 bits.

In another embodiment, upon reception of two or more Layer 1 signals to activate or release the UL SPSes for two or more serving cells, two or more SPS configuration indexes associated with two or more serving cells may be added into one MAC CE to confirm the UL SPS activation/release for each serving cell. For example, upon receiving the corresponding two or more SPS configuration indexes in the MAC CE, the network device 110 such as gNB can determine that the operation to activate/release UL SPSes for the two or more serving cells is successful. Otherwise, if one or more of the two or more SPS configuration indexes are not carried in the MAC CE, the network device 110 may determine that the operation to activate/release UL SPS for the one or more cells fails. In this case, the network device 110 may resend the UL SPS configuration messages to configure the UL SPS grant in the one or more cells.

Figure 8:
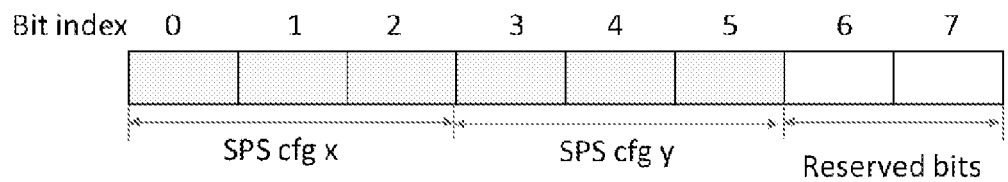
FIG. 8 schematically shows a MAC CE payload according to another embodiment of the present disclosure.

FIG. 8 shows the MAC CE payload comprising two or more SPS configuration indexes according to an embodiment of the present disclosure. As shown in FIG. 8, the MAC CE payload comprises two SPS configuration indexes x and y each of which may associate with a different serving cell. The size of the SPS configuration index has a fixed size such as 3 bits as shown in FIG. 8. In this embodiment, there are two Layer 1 signals for UL SPS activation/release respectively for two different serving cells in a short period, and the terminal device or UE may confirm the UL SPS activation/release for these two serving cells via a single MAC CE comprising the two SPS configuration indexes x and y.

In another example, a bitmap of one or more SPS configuration indexes in the MAC CE is used to indicate the confirmation of UL SPS activation/release for two or more serving cells. Each SPS configuration has a corresponding bit in the bitmap. The bitmap information may be ordered from LSB to MSB according to the value of SPS configuration index in an increasing order, and with a value set using the following logics:

bit "1" indicates that the corresponding SPS configuration is applied with the configuration/de-configuration.

bit "0" indicates that the corresponding SPS configuration is not applied with the configuration/de-configuration.

The length of the bitmap of one or more SPS configuration indexes may have a fixed length (e.g. depends on the maximum SPS configurations per MAC entity) or depend on the number of the SPS configurations that are configured for a UE.

Figure 9:
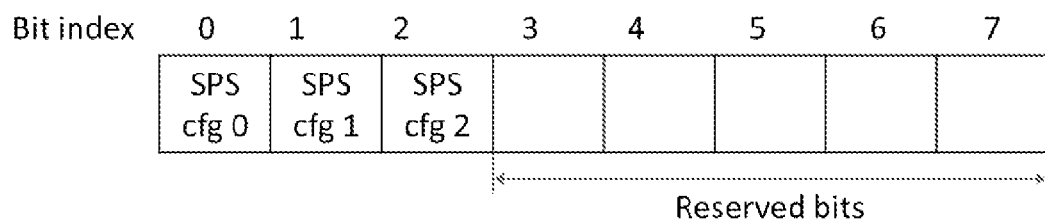
FIG. 9 schematically shows a MAC CE payload according to another embodiment of the present disclosure.

FIG. 9 shows the MAC CE payload comprising a bitmap of one or more SPS configuration indexes according to an embodiment of the present disclosure. As shown in FIG. 9, there are 3 bits (i.e., bit indexes 0, 1 and 2) corresponding to 3 UL SPS configurations (i.e., SPS configurations 0, 1 and 2) for a terminal device. For example, when the network device 110 sends, to the terminal device, three UL SPS configuration message (i.e., SPS configurations 0, 1 and 2) via the Layer 1 signal to configure three UL SPS grants in three cells, the terminal device may set the bits of the bit indexes 0, 1 and 2 as a value "1" and send the MAC CE comprising the bitmap to the network device.

It is noted the MAC CE payloads as shown in FIGS. 4-9 are only for the purpose of example, the MAC CE payload may take any other suitable form in other embodiments. For example, the size and content of the MAC CE payload may change in other embodiments. As an example, the size of the MAC CE payload may be 16, 32, 40, 48, 56, 64 bits or any other suitable value in other embodiments.

In another embodiment, there may be no format change to the existing LTE MAC CE "SPS confirmation MAC Control Element" in LTE. The network device such as gNB may establish a correspondence between the UL SPS configuration messages for activation/release of UL SPS grants for cells that are sent by the gNB, and the received MAC CEs that are replied by the UE, based on a predefined rule, such as the first received MAC CE from the UE corresponds to the first sent UL SPS configuration message, the second received MAC CE corresponds to the second sent UL SPS configuration message, and so forth.

In another embodiment, there may be no format change to the existing LTE MAC CE "SPS confirmation MAC Control Element" in LTE. The network device such as gNB may establish a correspondence between the UL SPS configuration messages for activation/release of UL SPS grants for cells that are sent by the gNB, and the MAC CEs that are replied by the UE, with timing correspondence between them. For example, the gNB sends a UL SPS configuration message to order a UE to configure/de-configuration UL SPS for a specific cell, at time X, then the gNB expects the UE to provide the MAC CE for confirmation of the UL SPS configuration message at time X+Y. The value range of Y may consider the transmission time and execution time of the UL SPS configuration message, and the transmission time of the corresponding MAC CE. The gNB may also provide a grant allocation for the UE in advance of the reception of the MAC CE.

In another embodiment, there may be no format change to the existing LTE MAC CE "SPS confirmation MAC Control Element" in LTE. There is a carrier correspondence between the carrier for which the UL SPS grant is configured or deconfigured and the carrier for transmitting the MAC CE. For example, the MAC CE for confirmation should be transmitted in the same UL carrier that the UL SPS grant is configured or deconfigured. In such way, the gNB can determine the correspondence of the received MAC CE and the Layer 1 signal to configure the UL SPS based on the carrier index on which the MAC CE is transmitted.

Figure 10:
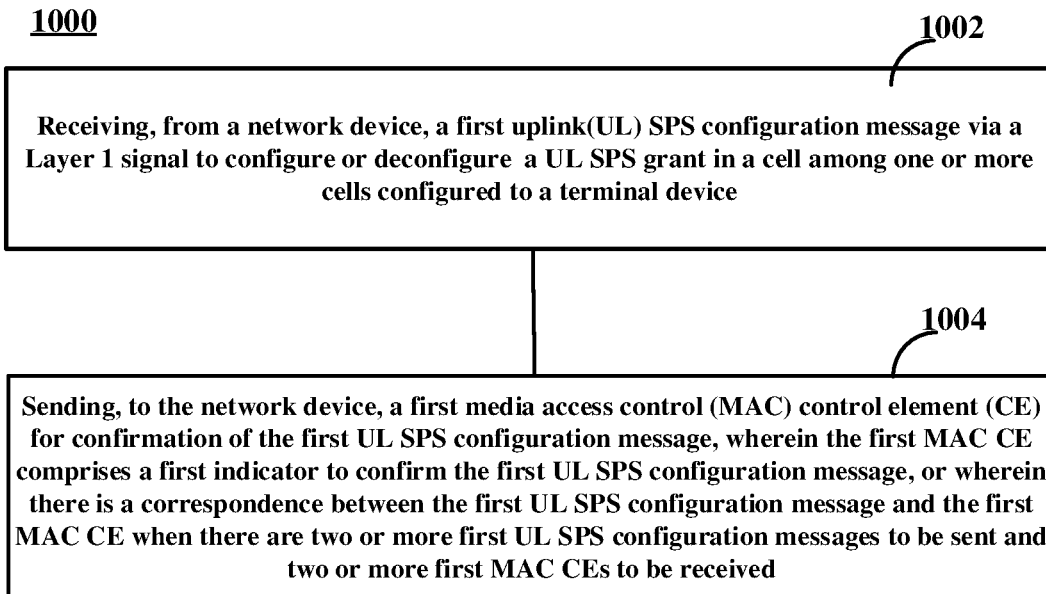
FIG. 10 is a flow chart depicting a method according to an embodiment of the present disclosure.

FIG. 10 is a flow chart depicting a method 1000 according to an embodiment of the present disclosure, which may be performed at an apparatus such as the terminal device 102 of FIG. 1. As such, the terminal device may provide means for accomplishing various parts of the method 1000 as well as means for accomplishing other processes in conjunction with other components. For some parts which have been described in the above embodiments, detailed description thereof is omitted here for brevity.

As shown in FIG. 10, the method 1000 may start at block 1002 where the terminal device 102 receives, from a network device, a first UL SPS configuration message via a Layer 1 signal to configure or deconfigure a UL SPS grant in a cell among one or more cells configured to a terminal device.

At block 1004, the terminal device 102 sends, to the network device, a first MAC CE for confirmation of the first UL SPS configuration message. The first MAC CE comprises a first indicator to confirm the first UL SPS configuration message, or wherein there is a correspondence between the first UL SPS configuration message and the first MAC CE when there are two or more first UL SPS configuration messages to be sent and two or more first MAC CEs to be received.

Figure 11:
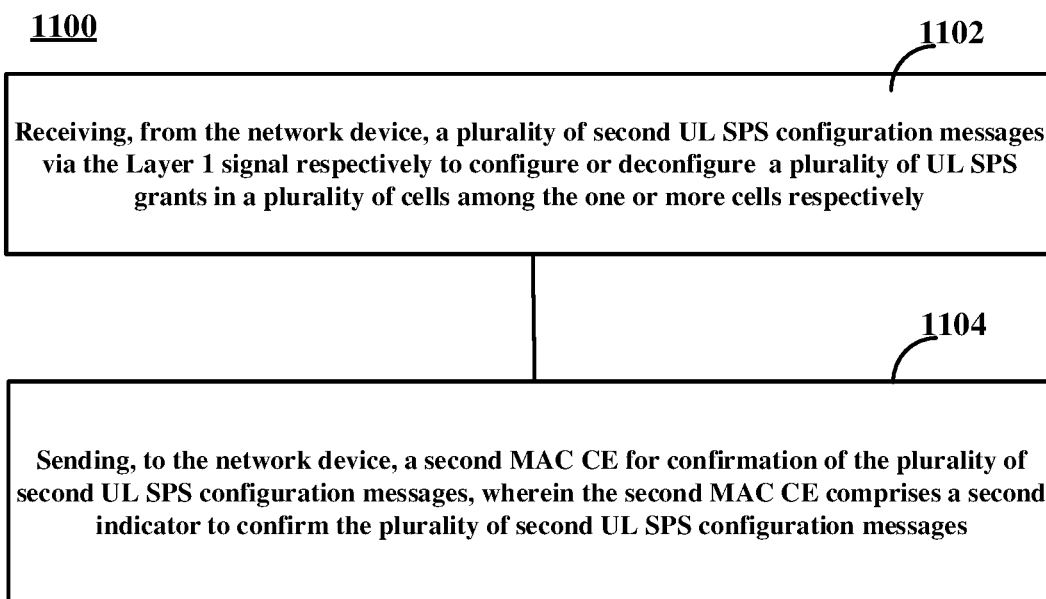
FIG. 11 is a flow chart depicting a method according to another embodiment of the present disclosure.

FIG. 11 is a flow chart depicting a method 1100 according to an embodiment of the present disclosure, which may be performed at an apparatus such as the terminal device 102 of FIG. 1. As such, the terminal device may provide means for accomplishing various parts of the method 1100 as well as means for accomplishing other processes in conjunction with other components. For some parts which have been described in the above embodiments, detailed description thereof is omitted here for brevity.

As shown in FIG. 11, the method 1100 may start at block 1102 where the terminal device 102 receives, from the network device, a plurality of second UL SPS configuration messages via the Layer 1 signal respectively to configure or deconfigure a plurality of UL SPS grants in a plurality of cells among the one or more cells respectively.

At block 1004, the terminal device 102 sends, to the network device, a second MAC CE for confirmation of the plurality of second UL SPS configuration messages, wherein the second MAC CE comprises a second indicator to confirm the plurality of second UL SPS configuration messages.

In an embodiment, the first and second indicators comprise at least one of one or more cell indexes; one or more SPS configuration indexes; a bitmap of one or more cell indexes; and a bitmap of one or more SPS configuration indexes.

In an embodiment, the bitmap of one or more cell indexes is ordered from least significant bit to most significant bit according to a value of the one or more cell indexes in an increasing or decreasing order.

In an embodiment, a length of the bitmap of one or more cell indexes is fixed or depends on a number of the cells that are configured for the terminal device.

In an embodiment, each configured cell for the terminal device has a corresponding bit in the bitmap of one or more cell indexes or each active cell for the terminal device has a corresponding bit in the bitmap of one or more cell indexes or each active cell configured with UL SPS for the terminal device has a corresponding bit in the bitmap of one or more cell indexes.

In an embodiment, a size of the cell index is fixed or depends on a maximum number of cells that can be configured in a carrier aggregation scenario.

In an embodiment, a UL SPS configuration is associated with a cell and is assigned with a unique SPS configuration index.

In an embodiment, the bitmap of one or more SPS configuration indexes is ordered from least significant bit to most significant bit according to respective values of the one or more SPS configuration indexes in an increasing/decreasing order.

In an embodiment, a length of the bitmap of the one or more SPS configuration indexes is fixed or depends on a number of the UP SPS configurations that are configured for the terminal device.

In an embodiment, the cell index in the MAC CE indicates that the corresponding cell is applied with the UL SPS configuration and the SPS configuration index in the MAC CE indicates that the corresponding SPS configuration associated with a cell is applied with the UL SPS configuration.

In an embodiment, the correspondence comprises at least one of a receiving order of the first UL SPS configuration message corresponding to a sending order of the first MAC CE; a timing correspondence between the receiving of the first UL SPS configuration message and the sending of the first MAC CE; and a carrier correspondence between the carrier for which the UL SPS grant is configured or deconfigured and the carrier for transmitting the first MAC CE.

In an embodiment, the UL SPS configuration message is used to activate or release UL SPS grant.

Figure 12:
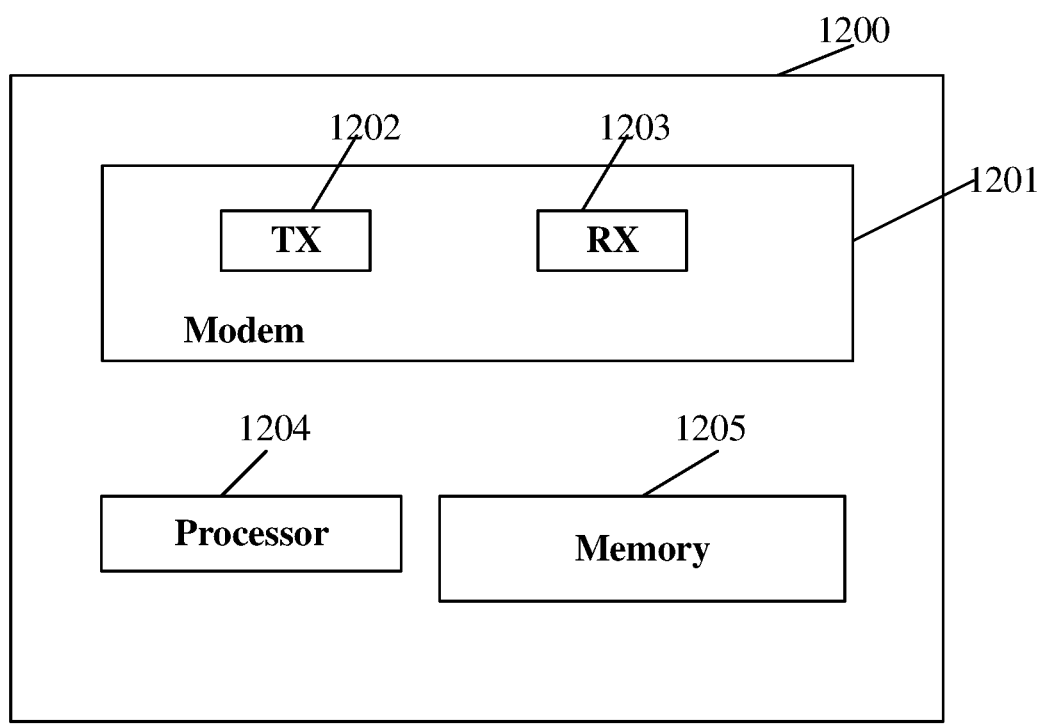
FIG. 12 is a block diagram illustrating a network device according to an embodiment of the disclosure.

FIG. 12 depicts a network device capable of implementing the methods for SPS as described above. As shown in FIG. 12, the network device 1200 comprises a processing device 1204, a memory 1205, and a radio modem subsystem 1201 in operative communication with the processor 1204. The radio modem subsystem 1201 comprises at least one transmitter 1202 and at least one receiver 1203. While only one processor is illustrated in FIG. 12, the processing device 1204 may comprises a plurality of processors or multi-core processor(s). Additionally, the processing device 1204 may also comprise cache to facilitate processing operations.

Computer-executable instructions can be loaded in the memory 1205 and, when executed by the processing device 1204, cause the network device 1200 to implement the above-described methods for SPS. In particular, the computer-executable instructions can cause the network device 1200 to send, to a terminal device, a first uplink(UL) SPS configuration message via a Layer 1 signal to configure or deconfigure a UL SPS grant in a cell among one or more cells configured to the terminal device; and receive, from the terminal device, a first MAC CE for confirmation of the first UL SPS configuration message, wherein the first MAC CE comprises a first indicator to confirm the first UL SPS configuration message, or wherein there is a correspondence between the first UL SPS configuration message and the first MAC CE when there are two or more first UL SPS configuration messages to be sent and two or more first MAC CEs to be received.

In an embodiment, the computer-executable instructions can further cause the network device 1200 to send, to the terminal device, a plurality of second UL SPS configuration messages via the Layer 1 signal respectively to configure or deconfigure a plurality of UL SPS grants in a plurality of cells among the one or more cells respectively; and receive, from the terminal device, a second MAC CE for confirmation of the plurality of second UL SPS configuration messages, wherein the second MAC CE comprises a second indicator to confirm the plurality of second UL SPS configuration messages.

In an embodiment, the first and second indicators comprise at least one of one or more cell indexes; one or more SPS configuration indexes; a bitmap of one or more cell indexes; and a bitmap of one or more SPS configuration indexes.

In an embodiment, the bitmap of one or more cell indexes is ordered from least significant bit to most significant bit according to a value of the one or more cell indexes in an increasing or decreasing order.

In an embodiment, a length of the bitmap of one or more cell indexes is fixed or depends on a number of the cells that are configured for the terminal device.

In an embodiment, each configured cell for the terminal device has a corresponding bit in the bitmap of one or more cell indexes or each active cell for the terminal device has a corresponding bit in the bitmap of one or more cell indexes or each active cell configured with UL SPS for the terminal device has a corresponding bit in the bitmap of one or more cell indexes.

In an embodiment, a size of the cell index is fixed or depends on a maximum number of cells that can be configured in a carrier aggregation scenario.

In an embodiment, a UL SPS configuration is associated with a cell and is assigned with a unique SPS configuration index.

In an embodiment, the bitmap of one or more SPS configuration indexes is ordered from least significant bit to most significant bit according to respective values of the one or more SPS configuration indexes in an increasing/decreasing order.

In an embodiment, a length of the bitmap of the one or more SPS configuration indexes is fixed or depends on a number of the UP SPS configurations that are configured for the terminal device.

In an embodiment, the cell index in the MAC CE indicates that the corresponding cell is applied with the UL SPS configuration and the SPS configuration index in the MAC CE indicates that the corresponding SPS configuration associated with a cell is applied with the UL SPS configuration.

In an embodiment, the correspondence comprises at least one of a sending order of the first UL SPS configuration message corresponding to a receiving order of the first MAC CE; a timing correspondence between the sending of the first UL SPS configuration message and the receiving of the first MAC CE; and a carrier correspondence between the carrier for which the UL SPS grant is configured or deconfigured and the carrier for transmitting the first MAC CE.

In an embodiment, the UL SPS configuration message is used to activate or release UL SPS grant.

Figure 13:
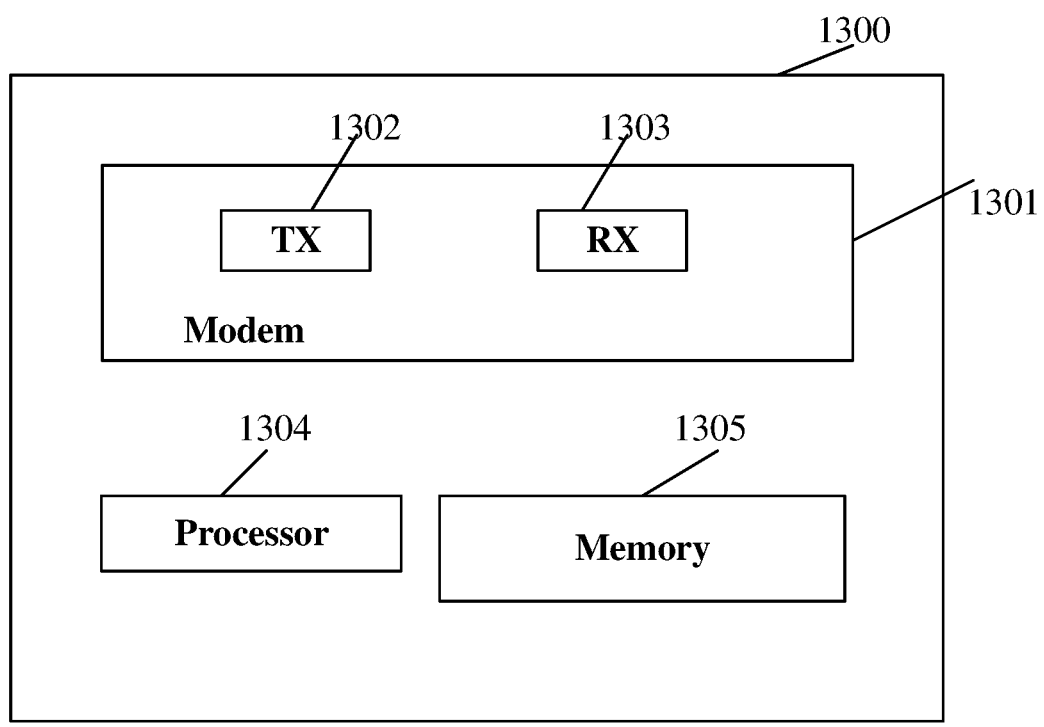
FIG. 13 is a block diagram illustrating a terminal device according to another embodiment of the disclosure.

FIG. 13 depicts a terminal device capable of implementing the methods for SPS as described above. As shown in FIG. 13, the terminal device 1300 comprises a processing device 1304, a memory 1305, and a radio modem subsystem 1301 in operative communication with the processor 1304. The radio modem subsystem 1301 comprises at least one transmitter 1302 and at least one receiver 1303. While only one processor is illustrated in FIG. 13, the processing device 1304 may comprises a plurality of processors or multi-core processor(s). Additionally, the processing device 1304 may also comprise cache to facilitate processing operations.

Computer-executable instructions can be loaded in the memory 1305 and, when executed by the processing device 1304, cause the terminal device 1300 to implement the above-described methods for SPS. In particular, the computer-executable instructions can cause the terminal device 1300 to receive, from a network device, a first UL SPS configuration message via a Layer 1 signal to configure or deconfigure a UL SPS grant in a cell among one or more cells configured to a terminal device; and send, to the network device, a first MAC CE for confirmation of the first UL SPS configuration message, wherein the first MAC CE comprises a first indicator to confirm the first UL SPS configuration message, or wherein there is a correspondence between the first UL SPS configuration message and the first MAC CE when there are two or more first UL SPS configuration messages to be sent and two or more first MAC CEs to be received.

In an embodiment, the computer-executable instructions can further cause the terminal device 1300 to receive, from the network device, a plurality of second UL SPS configuration messages via the Layer 1 signal respectively to configure or deconfigure a plurality of UL SPS grants in a plurality of cells among the one or more cells respectively; and send, to the network device, a second MAC CE for confirmation of the plurality of second UL SPS configuration messages, wherein the second MAC CE comprises a second indicator to confirm the plurality of second UL SPS configuration messages.

In an embodiment, the first and second indicators comprise at least one of one or more cell indexes; one or more SPS configuration indexes; a bitmap of one or more cell indexes; and a bitmap of one or more SPS configuration indexes.

In an embodiment, the bitmap of one or more cell indexes is ordered from least significant bit to most significant bit according to a value of the one or more cell indexes in an increasing or decreasing order.

In an embodiment, a length of the bitmap of one or more cell indexes is fixed or depends on a number of the cells that are configured for the terminal device.

In an embodiment, each configured cell for the terminal device has a corresponding bit in the bitmap of one or more cell indexes or each active cell for the terminal device has a corresponding bit in the bitmap of one or more cell indexes or each active cell configured with UL SPS for the terminal device has a corresponding bit in the bitmap of one or more cell indexes.

In an embodiment, a size of the cell index is fixed or depends on a maximum number of cells that can be configured in a carrier aggregation scenario.

In an embodiment, a UL SPS configuration is associated with a cell and is assigned with a unique SPS configuration index.

In an embodiment, the bitmap of one or more SPS configuration indexes is ordered from least significant bit to most significant bit according to respective values of the one or more SPS configuration indexes in an increasing/decreasing order.

In an embodiment, a length of the bitmap of the one or more SPS configuration indexes is fixed or depends on a number of the UP SPS configurations that are configured for the terminal device.

In an embodiment, the cell index in the MAC CE indicates that the corresponding cell is applied with the UL SPS configuration and the SPS configuration index in the MAC CE indicates that the corresponding SPS configuration associated with a cell is applied with the UL SPS configuration.

In an embodiment, the correspondence comprises at least one of a receiving order of the first UL SPS configuration message corresponding to a sending order of the first MAC CE; a timing correspondence between the receiving of the first UL SPS configuration message and the sending of the first MAC CE; and a carrier correspondence between the carrier for which the UL SPS grant is configured or deconfigured and the carrier for transmitting the first MAC CE.

In an embodiment, the UL SPS configuration message is used to activate or release UL SPS grant.

FIG. 14 is a flow chart depicting a method implemented in a communication system including a host computer, a network device and a terminal device according to an embodiment of the present disclosure, which may be performed at an apparatus such as the host computer 150 of FIG. 1. As such, the host computer may provide means for accomplishing various parts of the method 1400 as well as means for accomplishing other processes in conjunction with other components. For some parts which have been described in the above embodiments, detailed description thereof is omitted here for brevity.

As shown in FIG. 14, the method 1400 may start at block 1402 where the host computer 150 receives user data originating from a transmission from a terminal device to a network device. The network device is configured to perform the method associated with the network device as described above and the terminal device is configured to perform the method associated with the terminal device as described above.

FIG. 15 is a flow chart depicting a method implemented in a communication system including a host computer, a network device and a terminal device according to an embodiment of the present disclosure, which may be performed at an apparatus such as the host computer 150 of FIG. 1. As such, the host computer 150 may provide means for accomplishing various parts of the method 1500 as well as means for accomplishing other processes in conjunction with other components. For some parts which have been described in the above embodiments, detailed description thereof is omitted here for brevity.

As shown in FIG. 15, the method 1500 may start at block 1502 where the host computer 150 initiates a transmission carrying user data to the terminal device via the network device. The network device is configured to perform the method associated with the network device as described above and the terminal device is configured to perform the method associated with the terminal device as described above.

According to an aspect of the disclosure it is provided a computer program product comprising at least one non-transitory computer-readable storage medium having computer-executable program instructions stored therein, the computer-executable instructions being configured to, when being executed, cause a network device to operate as described above.

According to an aspect of the disclosure it is provided a computer program product comprising at least one non-transitory computer-readable storage medium having computer-executable program instructions stored therein, the computer-executable instructions being configured to, when being executed, cause a terminal device to operate as described above.

It is noted that any of the components of the network device and terminal device can be implemented as hardware or software modules. In the case of software modules, they can be embodied on a tangible computer-readable recordable storage medium. All of the software modules (or any subset thereof) can be on the same medium, or each can be on a different medium, for example. The software modules can run, for example, on a hardware processor. The method steps can then be carried out using the distinct software modules, as described above, executing on a hardware processor.

The terms "computer program", "software" and "computer program code" are meant to include any sequences or human or machine cognizable steps which perform a function. Such program may be rendered in virtually any programming language or environment including, for example, C/C++, Fortran, COBOL, PASCAL, assembly language, markup languages (e.g., HTML, SGML, XML), and the like, as well as object-oriented environments such as the Common Object Request Broker Architecture (CORBA), Java™ (including J2ME, Java Beans, etc.), Binary Runtime Environment (BREW), and the like.

The terms "memory" and "storage device" are meant to include, but not limited to, an electronic, magnetic, optical, electromagnetic, infrared, or semiconductor system, apparatus, or device, or any suitable combination of the foregoing. More specific examples (a non-exhaustive list) of the memory or storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the disclosure provided herein, one of ordinary skill in the related art will be able to contemplate other implementations of the components of the disclosure.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A host configured to operate in a communication system to provide an over-the-top (OTT) service, the host comprising:

processing circuitry configured to process user data; and a network interface configured to initiate reception of the user data via a network node in a cellular network for transmission to a user equipment (UE), the network node having a communication interface and processing circuitry configured to perform operations comprising:
sending, to the UE, at least one uplink (UL) configuration message to activate or deactivate a configured UL grant in at least one cell among one or more cells configured to the UE;
receiving, from the UE, a first confirmation message for confirmation of the at least one UL configuration message, wherein the first confirmation message comprises an indicator to confirm the at least one UL configuration message, the indicator comprises a bitmap wherein there is a correspondence between the at least one UL configuration message and one or more SPS configuration indexes, and the one or more SPS configuration indexes corresponds to a position in the bitmap;
receiving the user data from the UE according to a confirmed UL configuration; and
transmitting the user data to host to provide the OTT service.

2. The host of claim 1, wherein:
the processing circuitry of the host is configured to execute a host application associated with the OTT service that processes the user data from a client application associated with the OTT service, the client application configured to transmit user data to the host application and/or receive the user data from the host application.

3. The host of claim 1, further comprising:
sending, to the UE, a plurality of second UL configuration messages respectively to activate or deactivate a plurality of UL grants in a plurality of cells among the one or more cells respectively; and
receiving, from the UE, a second confirmation message for confirmation of the plurality of second UL configuration messages,
wherein the second confirmation message comprises a second indicator to confirm the plurality of second UL configuration messages.

4. The host of claim 3, wherein the first and second indicators comprise at least one of:
one or more cell indexes;
one or more SPS configuration indexes;
a bitmap of one or more cell indexes; and
a bitmap of one or more SPS configuration indexes.

5. The host of claim 4, wherein the bitmap of one or more cell indexes is ordered from least significant bit to most significant bit according to a value of the one or more cell indexes in an increasing or decreasing order.

6. The host of claim 4, wherein a length of the bitmap of one or more cell indexes is fixed or depends on a number of the cells that are configured for the UE.

7. The host of claim 4, wherein each configured cell for the UE has a corresponding bit in the bitmap of one or more cell indexes or each active cell for the UE has a corresponding bit in the bitmap of one or more cell indexes or each active cell configured with UL SPS for the UE has a corresponding bit in the bitmap of one or more cell indexes.

8. The host of claim 4, wherein a size of the cell index is fixed or depends on a maximum number of cells that can be configured in a carrier aggregation scenario.

9. A communication system configured to provide an over-the-top (OTT) service, the communication system comprising:

a host comprising:
processing circuitry configured to process user data associated with a user equipment (UE), the user data being associated with the OTT service; and
a network interface configured to initiate reception of the user data via a network node from the UE;
the network node, the network node having a communication interface and processing circuitry configured to:
send, to a UE, at least one uplink (UL) configuration message to activate or deactivate a configured UL grant in at least one cell among one or more cells configured to the UE;
receive, from the UE, a first confirmation message for confirmation of the at least one UL configuration message, wherein the first confirmation message comprises an indicator to confirm the at least one UL configuration message, the indicator comprises a bitmap wherein there is a correspondence between the at least one UL configuration message and one or more SPS configuration indexes, and the one or more SPS configuration indexes correspond to a position in the bitmap;
receive the user data from the UE according to a confirmed UL configuration; and
transmitting the user data to the host for provisioning of the OTT service.

10. The communication system of claim 9, further comprising:
at the host, executing a host application associated with the OTT service.

11. The communication system of claim 9, further comprising the UE, the UE having a client application, associated with the OTT service, stored in a computer-readable storage medium and executable by the UE to process the user data associated with the OTT service.

12. A a client application stored in a computer-readable storage medium, the client application being associated with an over-the-top (OTT) service and executable on a user equipment (UE) to transmit user data to a host application associated with the OTT service via a wireless communication network, the client application being operable to initiate transmission of the user data to or from the host application when executed by processing circuitry and transceiver circuitry of the UE to perform operations comprising:
receiving, from a network node, at least one uplink (UL) configuration message to activate or deactivate a configured UL grant in at least one cell among one or more cells configured to a UE; and
sending, to the network node, a first confirmation message for confirmation of the at least one UL configuration message, wherein the first confirmation message comprises an indicator to confirm the at least one UL configuration message, the indicator comprises a bitmap wherein there is a correspondence between the at least one UL configuration message and one or more SPS configuration indexes, and wherein the one or more SPS configuration indexes corresponds to a position in the bitmap; and
transmitting the user data from the client application to the host, via the network node, according to a confirmed UL configuration to provide the OTT service.

13. The user equipment of claim 12, wherein the host application cooperates with the client application to request transmission of the user data by the UE.

14. The user equipment of claim 12, further comprising:

receiving, from the network node, a plurality of second UL configuration messages respectively to activate or deactivate a plurality of UL grants in a plurality of cells among the one or more cells respectively; and sending, to the network node, a second confirmation message for confirmation of the plurality of second UL configuration messages, wherein the second confirmation message comprises a second indicator to confirm the plurality of second UL configuration messages.

15. The user equipment of claim 14, wherein the first and second indicators comprise at least one of:
one or more cell indexes;
one or more SPS configuration indexes;
a bitmap of one or more cell indexes; and
a bitmap of one or more SPS configuration indexes.

16. The user equipment of claim 15, wherein the bitmap of one or more cell indexes is ordered from least significant bit to most significant bit according to a value of the one or more cell indexes in an increasing or decreasing order.

17. The user equipment of claim 15, wherein a length of the bitmap of one or more cell indexes is fixed or depends on a number of the cells that are configured for the UE.

18. The user equipment of claim 15, wherein each configured cell for the UE has a corresponding bit in the bitmap of one or more cell indexes or each active cell for the UE has a corresponding bit in the bitmap of one or more cell indexes or each active cell configured with UL SPS for the UE has a corresponding bit in the bitmap of one or more cell indexes.

19. The user equipment of claim 15, wherein a size of the cell index is fixed or depends on a maximum number of cells that can be configured in a carrier aggregation scenario.

* * * * *

UNITED STATES PATENT AND TRADEMARK OFFICE
CERTIFICATE OF CORRECTION

PATENT NO. : 12,185,345 B2  
APPLICATION NO. : 18/607218  
DATED : December 31, 2024  
INVENTOR(S) : Liu et al.

Page 1 of 1

It is certified that error appears in the above-identified patent and that said Letters Patent is hereby corrected as shown below:

On the Title Page

In Item (63), under "Related U.S. Application Data", in Column 1, Line 2, delete "2023," and insert -- 2023, now Pat. No. 12,120,714, --, therefor.

In the Specification

In Column 1, Line 8, delete "2023," and insert -- 2023, and granted as U.S. Pat. No. 12,120,714 on Oct. 15, 2024, --, therefor.

In Column 5, Line 61, delete "header" and insert -- head --, therefor.

In Column 12, Line 61, delete "CO," and insert -- C0, --, therefor.

In Column 20, Line 51, delete "(ASICS)," and insert -- (ASICs), --, therefor.

In the Claims

In Column 21, Line 22, in Claim 1, delete "host" and insert -- the host --, therefor.

In Column 22, Line 38, in Claim 12, delete "A a" and insert -- A --, therefor.

Signed and Sealed this  
Twenty-third Day of December, 2025

John A. Squires  
*Director of the United States Patent and Trademark Office*